| United States Patent [19] | [11] Patent Number: 4,916,003 |
| --- | --- |
| Le Sech et al. | [45] Date of Patent: Apr. 10, 1990 |

[54] HEAT-FORMED COMPOSITE PANELS

[75] Inventors: Alain Le Sech, Tassin La Demi Lune;
Pierre-Francois Boilly, Champillon;
Rene Gest; Pierre Egly, both of
Rantigny, all of France

[73] Assignees: Isover Saint-Gobain; Societe Kerlane,
both of Courbevoie, France

[21] Appl. No.: 243,458

[22] Filed: Sep. 12, 1988

[30] Foreign Application Priority Data

Sep. 10, 1987 [FR] France ................. 87 12548

[51] Int. Cl.4 .................... B29C 1/00; B29L 9/00;
B32B 15/14; B32B 17/04; B32B 19/04

[52] U.S. Cl. ......................... 428/174; 156/222;
156/245; 156/307.7; 428/175; 428/285;
428/436; 428/542.8; 428/920

[58] Field of Search ............... 156/222, 307.7;
428/174, 175, 285, 436, 542.8, 920

[56] References Cited

U.S. PATENT DOCUMENTS

| 3,752,721 | 8/1973 | Clark et al. ............... | 156/148 |
| 4,128,678 | 12/1978 | Metcalfe et al. ............ | 428/120 |
| 4,308,308 | 12/1981 | Sachse ....................... | 428/241 |
| 4,310,585 | 1/1982 | Shannon ..................... | 428/218 |
| 4,347,271 | 8/1982 | Shannon ..................... | 428/284 |
| 4,522,673 | 1/1985 | Fell et al. .................. | 428/920 |
| 4,567,076 | 1/1986 | Therrien .................... | 428/920 |
| 4,664,968 | 5/1987 | Lord ......................... | 428/920 |
| 4,826,724 | 5/1989 | Bainbridge ................. | 428/920 |
| 4,835,046 | 5/1989 | Ardue et al. ............... | 428/920 |

FOREIGN PATENT DOCUMENTS

| 2130680 | 11/1972 | France . |
| 1310355 | 3/1973 | United Kingdom . |
| 1396363 | 6/1975 | United Kingdom . |
| 1592916 | 7/1981 | United Kingdom . |

*Primary Examiner*—James C. Cannon
*Attorney, Agent, or Firm*—Oblon, Spivak, McClelland, Maier & Neustadt

[57] ABSTRACT

A heat-formed composite panel composed of at least one layer of refractory fibers, for example silico-aluminous fibers, bonded with a mineral binder, an intermediate sheet in a water and water vapor sealed material, such as aluminum, and a layer of fibers, particularly glass fibers, bonded with a polymerized organic binder. The panel is a heat screen for high temperature automobile components.

10 Claims, No Drawings

HEAT-FORMED COMPOSITE PANELS

BACKGROUND OF THE INVENTION

1. Field of the Invention

The invention relates to heat-formed composite panels comprising at least two bonded fiber-based layers which are used in particular as a heat screen for the insulation of motor or other automobile components.

2. Background of the Prior Art

Composite panels based on mineral fibers of the glass fiber type bonded with a heat-hardenable organic resin are, for example, used as baffles, hood liners or interior flare opening liners in automobiles. They are manufactured by heat-forming a rough component composed of one or several layers of fibers impregnated with a binder which is at most partially polymerized, coated at least on one of its surfaces with a facing, for example in cloth. Such panels, of variable thickness, are rigid and have good mechanical holding. However, the risk of degradation of the organic binder through heat decomposition prevents their use near parts continuously exposed to more than 300° C. Consequently, such composite panels do not satisfy the requirements for a heat screen protecting, for example, a turbocompressor, which operates for automobiles at slightly more than 700° C., a catalytic muffler where maximum efficiency is obtained with gases at approximately 700° C. or even for the covering from beneath of the motor with a view to better penetration in the air of the vehicle.

However, numerous fibers can take such temperatures. For example, basaltic rock or slag fibers, silico-aluminous fibers (ceramic fibers), asbestos fibers, etc., can be mentioned. Glass fibers also resist with no problems at temperatures around 450° C. The difficulty is to find a satisfactory binder. Therefore, for such temperatures, a mineral binder of the clay type, such as an alkaline silicate, an ethyl silicate, an alumina phosphate or even colloidal alumina must most often be used. These binders are efficient up to 700°-1200° C. but, unfortunately, the formed products obtained are fairly friable and are suitable only for static uses and not in locations which are frequently under vibration, such as automobiles.

SUMMARY OF THE INVENTION

The object of the invention is a heat-formed composite panel based on bonded fibers which is resistant at high temperatures and has good holding qualities when vibrated. The composite panel in accordance with the invention is composed of at least one layer of fibers bonded with a mineral binder, an intermediate layer comprised of a material which is water and water vapor resistant and a layer of fibers bonded using a polymerized organic binder. The panel is preferably coated on both its surfaces or at least on its cold surface with a sheet of aluminum.

The sealed intermediate layer prevents the water released during the forming with the mineral binder to penetrate into the layer of organic binder which would be harmful to the polymerization of the resin since this chemical polymerization reaction leads to a release of water molecules and occurs only after a drying phase.

The fibers bonded by a mineral binder are preferably fibers which will be described herein as "refractory", that is with good resistance to temperatures of more than 300° C., such as for example silico-aluminous fibers (ceramic fibers), asbestos fibers, basaltic rock fibers, blast furnace slag fibers, aramid fibers, glass fibers, or even a mixture of said different fibers. Heat resistance at more than 1000° C. leads to a more particular preference for ceramic fibers.

As the mineral binder, an alkaline silicate, ethyl silicate, silica or colloidal alumina, or phosphatic binders, particularly alumina phosphate or magnesia phosphate, are more especially used. The silicate derivatives are more particularly preferred insofar as they are compatible with the aluminum material which is most particularly suitable for forming the sealed barrier between the two fibrous layers.

The fibers bonded with a polymerized organic binder can be selected from among the group of refractory fibers indicated above by preferably selecting those of such fibers which are the least expensive and which provide a layer having good mechanical resistance. Vegetable fibers can also be used, for example cotton or cellulose fibers or any other type of natural or artificial fibers which are resistant to temperatures of less than or equal to 300° C. Glass fibers are preferably used which are produced by centrifuging and drawing using high temperature and high speed gas currents in accordance with the fibering method described in Patent EP 91866, using a conventional method for the manufacture of insulating cushions, with the organic binder being sprayed on the fibers in a fibering hood. The cushions used preferably have a surface mass of between 450 and 2000 g/m$^2$.

The organic binder is heat-hardenable, preferably a urea-formol, formo-phenolic or melanine-formol resin, or a phenol-formaldehyde resin which is or is not modified with urea, or any other resin which can be used in the glass fiber industry.

As indicated above, the water and water vapor sealing barrier arranged between the two layers of fiber is preferably aluminum, although flexible sheets of stamped sheet metal can be used. On the refractory fiber side, the mineral binder is as a general rule fully compatible with the aluminum which ensures perfect adhesion. On the cold surface side, a silicate glue will be used, for example, if the temperature of said interface is continuously above 250° C.

The facing sheets, for example in aluminum or stainless steel, are glued to the layers of fibrous materials in an identical manner. In addition to providing the molded product with a certain esthetic quality, these facing sheets protect the layers of fibrous materials from dirt, water, oil and tearing due, for example, to gravel. In addition, the molded product is also more pleasant to handle for the workers assigned to install it. Since aluminum oxidizes at temperatures above 600° C., only the cold surface of the product is coated for high temperature uses. It should also be noted that aluminum has a high heat-reflecting capability which improves the efficiency of the heat screen composed of the composite panel.

The composite panel is prepared by heat-forming, in one operation, a stratified material comprising successively a facing sheet, for example in aluminum (optional), a moist layer of refractory fibers internally impregnated with a mineral binder, a water and water vapor sealing sheet, preferably of aluminum, possibly an adhesive layer of aluminum-glass wool of the silicate type, a cushion of fibers impregnated with an organic resin in a non-polymerized state and, optionally, another facing sheet and its adhesive. Forming is carried with a mold and a counter-mold brought to a temperature of between 200° and 250° C., for a period of 3 to 15 minutes, with the stratified material being subjected to pressure on the order of 3 kg per cm$^2$.

It is preferable to use a layer of refractory fibers impregnated with a mineral binder having an initial water content of between 10 and 80 and preferably about 30%. With a water content of less than 10%, the layer of refractory fibers is too breakable to be moldable; on the other hand, with water contents which are too high, the quantity of vapor which is released during forming is such that, in view of the pressure and the temperature of the mold, a counter-pressure force is created which prevents the closing of the mold and the panel obtained after heat forming has an unsatisfactory appearance, with shapes not corresponding to the desired characteristics.

For good polymerization and preservation of the organic resin, said resin must not be in contact with the water vapor or liquid water. The layer of fibers impregnated with organic resin is therefore protected from the layer containing a mineral binder by a sealing sheet, preferably of aluminum, as indicated above. This sealing sheet provides a composite product having the advantages of refractory fibers impregnated with a mineral binder, that is, essentially, good resistance at high temperatures and the advantages of fibers bound using an organic resin, that is, essentially, good mechanical resistance.

In order to obtain perfect sealing of the edges, the layer of refractory fibers preferably does not extend to the edges of the composite component but stops at a few millimeters, even at a few centimeters if only one part of the component is likely to be exposed to the highest temperatures. The glass fibers or vegetable fibers can in effect be very highly compressed to form narrower edges which is only partially true for the fibers bonded with a mineral binder. In addition, the panel acts better under vibration when it is light and the mineral binder is the component which contributes the most weight to the composite panel. For these reasons and also for cost considerations, the composition panels may contain layers of refractory fibers with mineral binder only in certain selected areas which are the most exposed to high temperatures without departing from the scope of the invention.

Examples of composite panels are described below.

EXAMPLE 1

A rectangular, flat panel, 175 mm long, 160 mm wide and 1 cm thick after molding, intended to be used for test pieces.

For this purpose a stratified material was prepared comprising the following layers:

a sheet of aluminum 0.1 mm thick, a moist layer 25 mm thick based on ceramic fibers, the chemical composition of which, after drying, was 45% $SiO_2$ and 49% $Al_2O_3$ ("KERLANE 45" fibers, trademark of the Kerlane Company). The layer was impregnated internally with a mixture of colloidal silica and alumina. The water content was 30%, the surface mass of ceramic fibers was 6.5 kg/m$^2$ and that of the mineral binder was 1.4 kg/m$^2$.

a sheet of aluminum 0.05 mm thick, a rough component formed of glass fibers obtained in accordance with the fibering method described in Patent EP 91866 and recovered in a conventional manner for methods of manufacturing insulating cushions, with incorporation of the binder at the moment of fibering (content of non-polymerized binder approximately 17%; resol type resin modified with urea having a formaldehyde/phenol molar ratio of approximately 3). The surface mass of the glass fibers was 1500 g/m$^2$ and the water content was 3%.

a sheet of aluminum 0.1 mm thick.

The stratified component was molded in one operation in an abutment press with a mold and a counter-mold traversed by a heat-bearing fluid which provided uniform heating at 200° C. The pressing was continued for 7 minutes.

The composite component obtained had a good appearance. The layers adhered perfectly to one another and the component had good resistance to vibrations. (After 6000 hours, the loss of mass was less than 1%, if the component was subjected to vibrations with a 2 mm amplitude under a frequency equal to 50 Hz.)

EXAMPLE 2

The same method was used as in Example 1, but this time it was in order to form a shaped component intended to cover the head of a catalytic muffler for an automobile. The component had the desired characteristics.

EXAMPLE 3

The same method was used as in Example 2, but this time the water content of the ceramic layer was 300%. The component did not conform to the mold in the most highly curved areas.

EXAMPLE 4

The same method was used as in Example 2, but this time the water content of the ceramic layer was 5%. The ceramic layer deteriorated during the shaping.

EXAMPLE 5

The same method was used as in Example 2, but removing the aluminum facing sheets. The component conformed to the mold. Only the esthetic quality of the panel was affected.

What is claimed as new and desired to be secured by Letters Patent of the United States is:

1. A composite molded panel composed of at least one layer of fibers impregnated with a mineral binder, an intermediate layer impervious to water and water vapor and a layer of fibers impregnated with an organic binder on the side of said intermediate layer opposite said mineral binder.

2. The composite panel in accordance with claim 1, wherein the fibers of the layer impregnated with a mineral binder are selected from the group consisting of silico-aluminous fibers, asbestos fibers, basaltic rock fibers, blast furnace slag fibers, aramid fibers, glass fibers and a mixture of said fibers.

3. The composite panel in accordance with claim 1, wherein the fibers of the layer impregnated with an organic binder are selected from the group consisting of silico-aluminous fibers, asbestos fibers, basaltic rock fibers, blast furnace slag fibers aramid fibers, glass fibers, cellulose fibers, cotton fibers and a mixture of said fibers.

4. The composite panel in accordance with claim 1, wherein the mineral binder is selected from the group consisting of ethyl silicate, alkaline silicate, colloidal silica, colloidal alumina, alumina phosphate and magnesia phosphate.

5. The composite panel in accordance with claim 1, wherein the intermediate sheet is comprised of aluminum.

6. The molded composite panel in accordance with claim 1, wherein the panel is covered on at least its cold surface with a facing sheet.

7. The composite panel in accordance with claim 1, wherein the panel contains a layer of refractory fibers only in the areas of the panel likely to be exposed to high temperatures.

8. A method for obtaining a composite panel, comprising preparing a stratified component, of a moist layer of refractory fibers impregnated with a mineral binder on a sealing intermediate sheet which in turn is on a cushion of glass fibers impregnated with a heat hardenable organic binder, polymerizing of the mineral binder and the organic binder simultaneously by the heat-forming, pressing said components in a single operation between a mold and a counter-mold heated to a temperature of between 100° and 250° C.

9. The method in accordance with claim 7, wherein said moist layer has a water content of between 10 and 80%.

10. The method of claim 9, wherein said water content is about 30%.

* * * * *